Aug. 27, 1968       H. O. CORBETT       3,398,431
LAMINATING EXTRUSION DIE
Filed Oct. 23, 1964       4 Sheets-Sheet 1
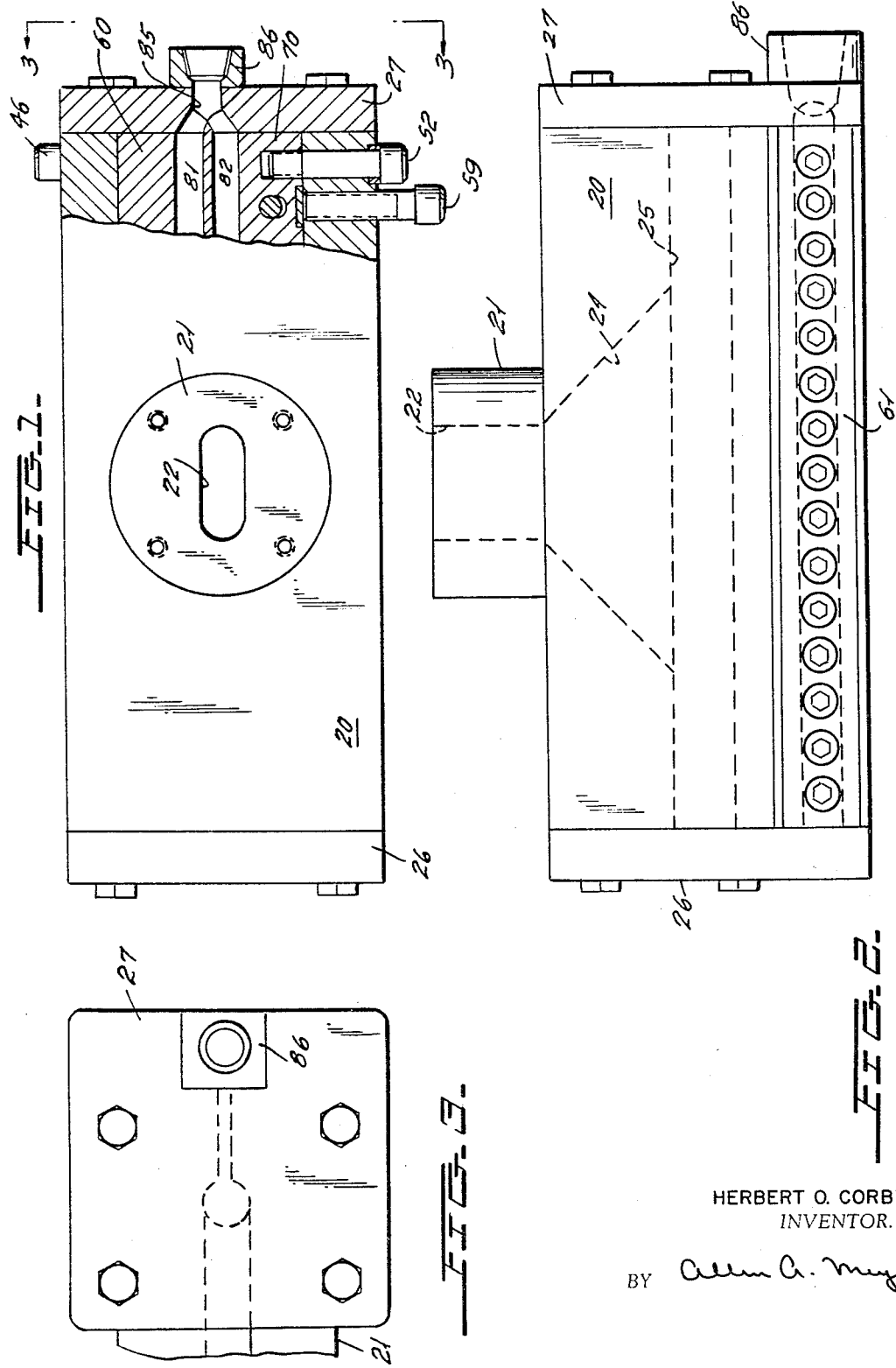
HERBERT O. CORBETT
INVENTOR.

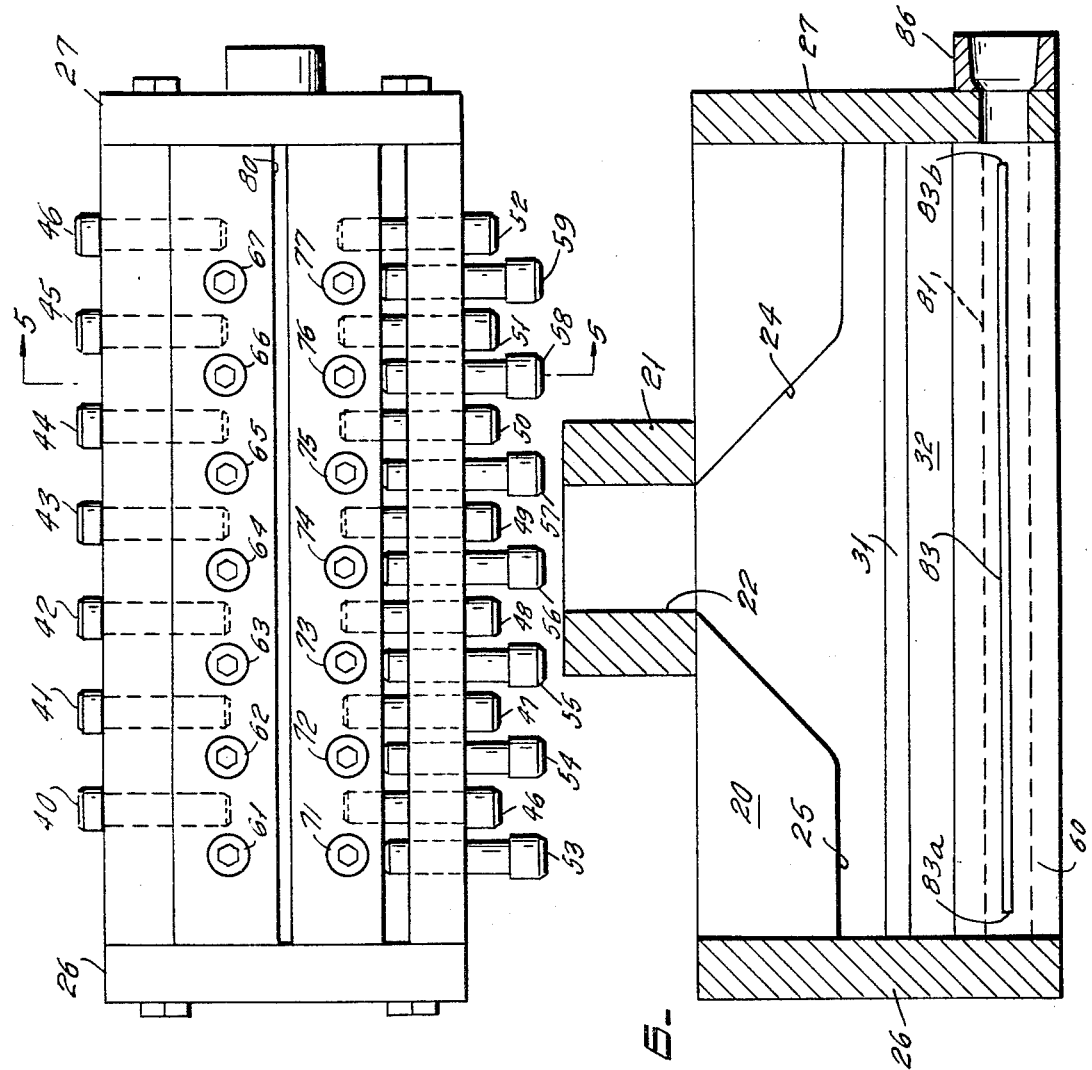

Aug. 27, 1968   H. O. CORBETT   3,398,431
LAMINATING EXTRUSION DIE
Filed Oct. 23, 1964   4 Sheets-Sheet 3
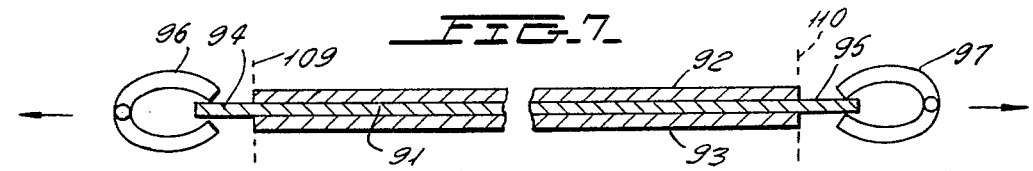
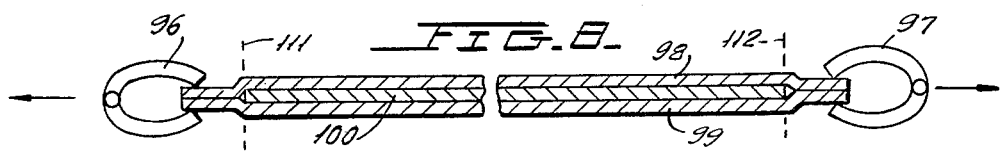
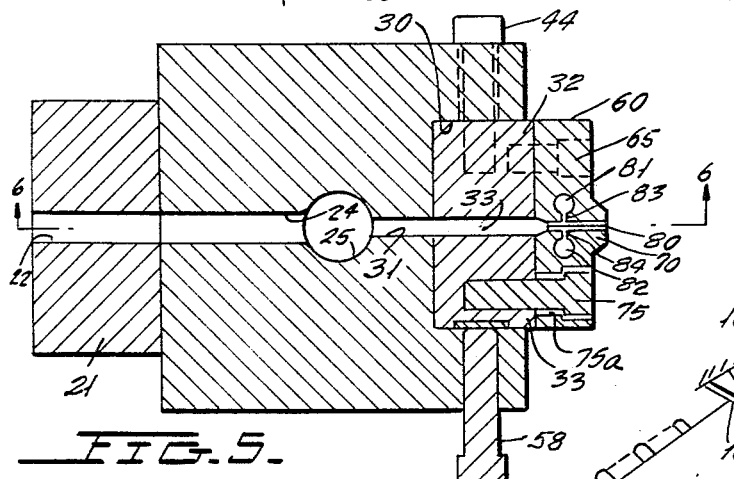
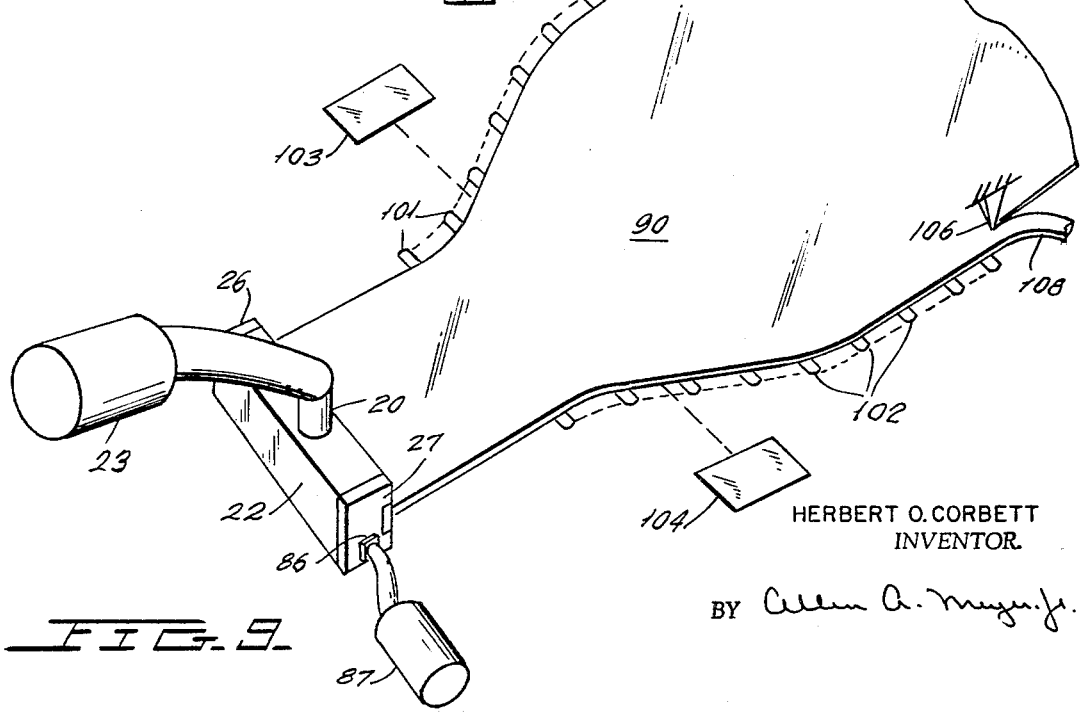
HERBERT O. CORBETT
INVENTOR.
BY Allen A. Meyer Jr.

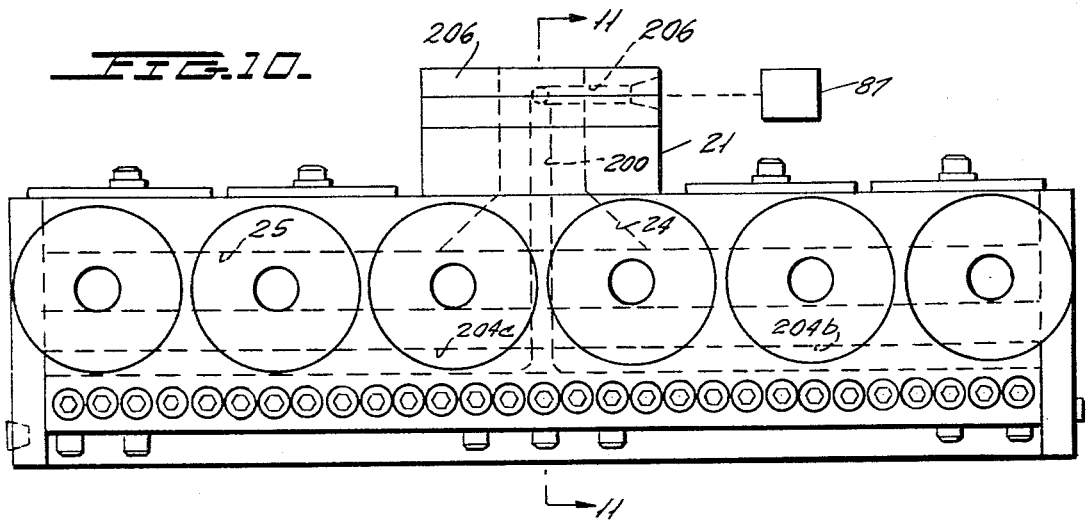
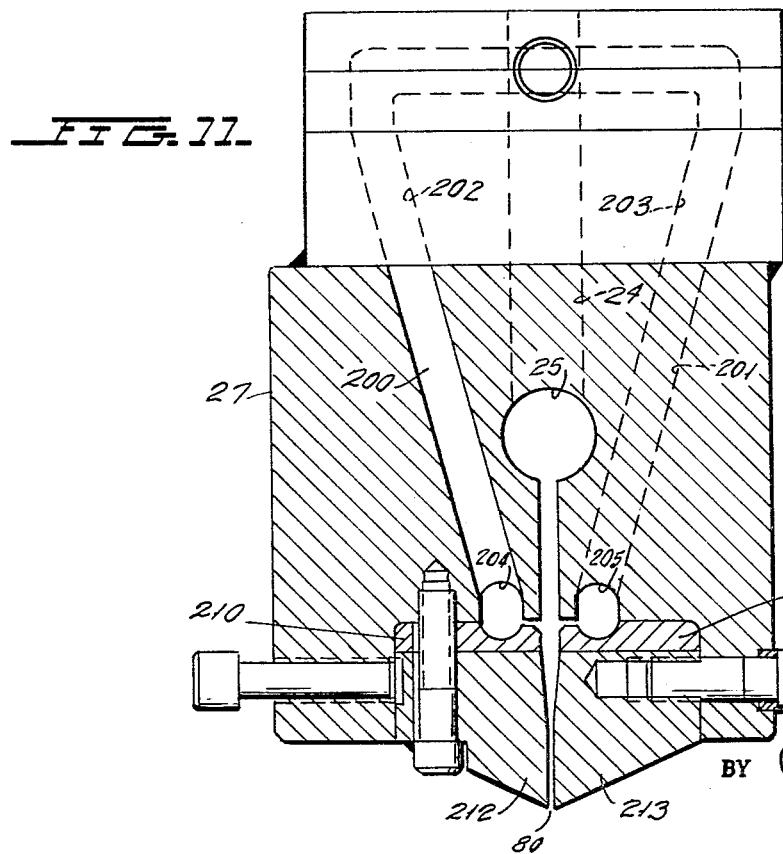

United States Patent Office 3,398,431
Patented Aug. 27, 1968

3,398,431
LAMINATING EXTRUSION DIE
Herbert O. Corbett, Bridgeport, Conn., assignor to National Distillers and Chemicals Corporation, New York, N.Y., a corporation of Virginia
Filed Oct. 23, 1964, Ser. No. 406,136
7 Claims. (Cl. 18—13)

ABSTRACT OF THE DISCLOSURE

A lamination extrusion die having spaced die lips forming a discharge orifice. Each of the die lips contain axial channels which communicate with the spaced discharge orifice between them, with a first extruded product flowing through the spaced lips and second extruded products being introduced into the channels in the die lips to form laminated coatings on the plastic extruded through the main channel. The extrusion channels in the die lips may be longer or shorter than the main discharge space so that the edges of the laminated product will be of uniform composition. The channels in the die lips are fed from either the end of the die or from channels extending transversely of the main length of the die.

---

This invention relates to extrusion dies for the extrusion of thin plastic film, and more particularly relates to a novel extrusion die which laminates at least a first and second plastic film across the transverse width of one another with the width of one of the films falling short of the edges of the other of the films. In accordance with the invention, tenter frame clips used for subsequent orientation of the film grasp a film material of a single composition whereby when this material is removed from the edges of the film and returned for recycling, the recycled product will be of a uniform material.

This invention is an improvement of copending application, Ser. No. 350,220, filed Mar. 9, 1964, and assigned to the assignee of the present invention, in which a novel laminating arrangement is provided wherein a plurality of flows of diverse plastic materials come together laminarly before extrusion through the die outlet orifice so that the resulting product is of a laminated nature. By way of example, the above noted application illustrates the formation of a typical film which has a central polypropylene layer laminated between outer polyethylene layers. This type of material has particular utility as a film wrap which is to be heat sealed in that the central polypropylene layer adds stiffness or "handle" to the film, while the relatively inexpensive outer polyethylene layers which form the major portion of the thickness of the film can be heat sealed to one another. Moreover, and as described in the above noted application, the temperature seal range of the film is substantially expanded when using a laminated film.

In accordance with the first feature of the present invention, and when applying the laminating steps of the above noted application to die structures for extruding flat film, it has been found that additional orifices for the extrusion process can be connected immediately adjacent the outlet die orifice. Moreover, it has been found that the transverse width of these additional die orifices can be made shorter than the width of the orifice receiving the central film product whereby the laminated product will be a sheet whose central laminated layer extends outwardly beyond its overlying or sandwiching layers. Alternatively, the intermediate flow channel associated with the central film product can have a width less than the width of the flow channels of the outer layers whereby the width of the outer layers in the film produced will extend beyond the central layer edges.

This novel arrangement has substantial utility when the film is stretched in a suitable tenter frame after extrusion. Tenter frame arrangements of this type are well known to those skilled in the art and are typically shown in copending application, Ser. No. 350,220. Thus, in the production of flat film, it is common practice to connect tenter clips to the opposite edges of the film after its extrusion, and thereafter transversely stretch the film by moving the clips on the opposite sides of the film away from one another.

After this stretching operation is completed, it is further common practice to trim the film edges where they have been gripped by the tenter frame clips. This trimmed material is then recycled or returned to an extruder so that it can be subsequently reused.

When producing laminated film, this recycled material will normally be composed of a mixture of diverse products, such as polyethylene and polypropylene. In accordance with the present invention, however, the one or more film layers of the same material will extend transversely beyond the layers of the other materials whereupon when this material is trimmed and recycled, it will be uncontaminated by the other diverse material used in the film.

As a further important advantage of the invention and where, for example, a central polypropylene layer has two outer polyethylene layers, the polypropylene layers may extend outwardly beyond the polyethylene layers. Thus, the tenter clips will be secured directly to the polypropylene material rather than the polyethylene materials. Since it is well known that tenter clips tend to stick to polyethylene more than to polypropylene, the advantages of this arrangement are obvious.

Accordingly, a primary object of this invention is to provide a novel laminating extrusion die.

Another object of this invention is to prevent the contamination due to recycled material in a laminated film extruding apparatus.

Yet another object of this invention is to provide a nonsticking connection between a laminated film and the tenter system clips used to stretch the film.

Yet a further object of this invention is to provide a novel laminated flat film in which one or more layers of the film extend transversely beyond the side edge of the other layers of the film.

These and other objects of this invention will become apparent from the following description when taken in connection with the drawings, in which:

FIGURE 1 is a top view partially in cross-section of the novel extrusion die of the invention.

FIGURE 2 is a front plan view of FIGURE 1.

FIGURE 3 is a side plan view of FIGURES 1 and 2.

FIGURE 4 is a bottom plan view of the die of FIGURES 1, 2 and 3.

FIGURE 5 is a cross-sectional view of FIGURE 4 taken across the lines 5—5 in FIGURE 4.

FIGURE 6 is a cross-sectional view of FIGURE 5 taken across the lines 6—6 in FIGURE 5.

FIGURE 7 illustrates a cross-sectional view of a film product having a central layer of a greater width than its outer layers in combination with tenter frame clips which are schematically illustrated as connected to the extending edges of the central layer.

FIGURE 8 is similar to FIGURE 7, but illustrates the overlying layers of the film laminate extending transversely beyond the central film laminate.

FIGURE 9 schematically illustrates in perspective view the manner in which the film is transversely stretched by the tenter frame with the film edges thereafter being slit from the main film body.

FIGURE 10 illustrates a second embodiment of the invention wherein the die structure is essentially that described above where, however, the additional die orifices are centrally fed rather than end fed, as shown in FIGURES 1 through 4.

FIGURE 11 is a cross-sectional view of FIGURE 10 taken across the lines 11—11 in FIGURE 10 with other minor variations being made in the die structure.

Turning now to FIGURES 1 through 6, the novel die of the invention is comprised of a main die body 20 which has a slotted connecting member 21 suitably clamped thereto and adapted to be connected to a suitable extruder. The adapter 21 thus has an elongated slot 22 therein which, for example, can be connected to some suitable extruder, such as extruder 23 of FIGURE 9, and communicates with a fan tail slot 24 which communicates with a circular distribution channel 25 located centrally in the die body 20. The ends of channel 24 are then closed by suitable end plates 26 and 27 which are suitably bolted to the body 20.

The body 20, as best seen in FIGURE 5, has a lower square opening 30 which communicates with distribution channel 25 by flow path 31 and receives a first and second elongated member 32 and 33, respectively, as best shown in FIGURES 5 and 6. The members 32 and 33 are spaced from one another by a predetermined distance defining the channel 33 in FIGURE 5 which communicates with channel 31 from the main extruder.

The member 32 is rigidly mounted within the rectangular cavity 30 by a plurality of bolts, such as bolts 40 through 46 of FIGURES 4 and 5, which extend through openings (not shown) in body 20 and into respective tapped openings in member 32. The member 33, however, is adjustably positioned within rectangular cavity 30 and is secured therein by a bolt arrangement which includes alternate securing bolts 46 through 52 (FIGURE 4) and spacer bolts 53 through 59, as shown in FIGURES 1, 4 and 5. Note that each of the spacer bolts, such as spacer bolt 57, can bear on a suitable pressure plate, such as plate 57a, shown in member 33 in FIGURE 5. Member 33 can now be rigidly fixed in adjustable spaced relation with respect to member 32.

The member 32 then carries a first die lip 60, which is directly connected to member 32 by a plurality of bolts, such as bolts 61 through 67 in FIGURE 4. A second and cooperating die lip 70 is then secured to member 33 by means of a similar plurality of bolts 70 through 77. Note, however, that the openings in die lip 70 receiving each of bolts 71 through 77 is an elongated opening, such as opening 75a, shown in FIGURE 5, for receiving bolt 75. This arrangement permits the lateral adjustment of die lip 70 with respect to die lip 60 independently of the spacing between members 32 and 33. The two opposing die lips 60 and 70 then define a channel 80 which is the discharge orifice of the die and which communicates with channel 33.

In accordance with the first feature of the invention, and to provide additional flow channels for the film which will laminate to the flow coming from flow channel 33, it has been found that elongated conduits 81 and 82 can be placed in die lips 60 and 70, respectively, having discharge slots 83 and 84, respectively, extending directly to the surface of channel 80. Each of channels 81 and 82 extend along the full width of the die body 20 with their right-hand being closed off as by the plate 26. The left-hand end of channels 81 and 82, however, communicate with a suitable opening 85 in plate 27 and a conduit connecting means 86 welded to plate 27. The opening 85, as best shown in FIGURE 1, then communicates with both channels 81 and 82. Thus, the connector 86 will be connected to a second extruder, schematically illustrated in FIGURE 9 as extruder 87, whereby extruder 87 may be a source, for example, of polyethylene while extruder 23 can be a source of polypropylene.

Referring now to FIGURE 5, it will be understood that polypropylene will extend through channels 22, 24, 25, 31, 33 and through the discharge orifice 80. The polyethylene from channels 81 and 82 will then pass through channels 83 and 84 to deposit polyethylene layers atop the central polypropylene layer so that a laminated film product will issue from discharge orifice 80. This laminated product is shown as laminated product 90 in FIGURE 9. To this point, the present invention generally involves a novel laminating extrusion die.

In accordance with a further feature of the invention, the transverse length of discharge channels 83 and 84 may be restricted, as illustrated in FIGURE 6, so that the ends 83a and 83b in FIGURE 6, for channel 83 fall within the ends of the main discharge channel 80 which is defined by the opposing surfaces of plates 26 and 27. With this novel arrangement the film which is formed will be of a nature illustrated in FIGURE 7, having a central layer 91, for example, of polypropylene, and having opposing layers 92 and 93 (from channels 83 and 84, respectively) which are, for example, of polyethylene. The central layer 91, however, would occupy the complete width of the die from the end plates 26 and 27 so that it will have extending end portions 94 and 95 which extend beyond the side edges of layers 92 and 93.

In accordance with the invention, the ends 94 and 95 can be grasped by tenter frame clips, schematically illustrated in FIGURE 7, by clips 96 and 97 which clips are caused to move away from one another thereby imparting a transverse stretch to the film to cause film orientation in the usual manner. It is significant that the tenter clips 96 and 97 will grasp the polypropylene layer 91 rather than the outer polyethylene layers 92 and 93 which would be the case had the film been formed in the usual manner. The tenter clips 96 and 97, however, do not stick to polypropylene as they do to polyethylene so that the problem of sticking tenter clips is avoided.

Note, however, as shown in FIGURE 8, that the die of FIGURES 1 through 6 can be arranged so that the outer layers 98 and 99 can have a transverse width greater than that of the central layer 100 whereupon the tenter clips 96 and 97 grasp the outer layers 98 and 99 independently of the central layer 100.

A typical tenter frame assembly is schematically illustrated in FIGURE 9 where it is seen that the film 90 has been gripped at its sides by the tenter clips, such as tenter clips 101, on one side, and 102 on the other side. Each of the tenter clips are suitably connected, as illustrated by dotted lines, to suitable operating mechanisms 103 and 104 which cause the tenter clips to transversely stretch the film.

After the transverse stretching operation, the edges of the film which have been gripped by the tenter clips are trimmed by trimming knives 105 and 106 to produce trim strips 107 and 108. These trim strips are commonly recycled and returned to the extruder so as not to be a loss of waste. In the case of laminated film, however, and in the past, the composition of strips 107 and 108 has included more than one product.

In accordance with the present invention, the trimming can occur, for example, along the dotted lines 109 and 110 in FIGURE 7 or 111 and 112 in FIGURE 8. Therefore, the trimmed material will be of a uniform material and can be returned for recycling without contaminating the plastic mix. Thus, in FIGURE 7, the trimmed regions consist entirely of polypropylene and could be directly returned to the extruder 23. In FIGURE 8, the trimmed regions will be consistently of the material of the outer layers 98 and 99 and thus can be returned to extruder 87.

In the embodiment of FIGURES 1 through 6, the die structure illustrated is essentially an end fed die. This type of arrangement is subject to certain disadvantages in the distribution of the plastic melt along the length of the orifices and can be overcome by the use of a centrally fed die system.

A typical centrally fed system is illustrated in FIGURES 10 and 11 wherein structures equivalent to those of FIGURES 1 through 6 are given similar identifying numerals.

Referring now to FIGURES 10 and 11, the main die body 27 having channel 25 therein is further provided with two channels 200 and 201 which extend into similar additional channels 202 and 203 in connecting member 21.

As best shown in FIGURE 10, channels 200 (and 201 not shown) are aligned with one another and communicate with respective elongated channels 204 and 205 which correspond to channels 81 and 82 of FIGURES 1 through 6. The upper ends of channels 202 and 203 are then connected to a common channel 206 (FIGURE 10) which is schematically shown as being connected to the extruder 87. Thus, the channel 200 in FIGURE 10 extends outwardly into channel halves 204a and 204b which constitute the channel 204 whereby material from extruder 87 is center-fed into channel 204.

The bottom of channels 204 and 205, as best shown in FIGURE 11, are then enclosed by adjustment plates 210 and 211 which are held immediately adjacent the die lips 212 and 213, respectively, which define the discharge orifice 80. Note that the die lips 212 and 213 correspond to die lips 60 and 70, respectively, but are mounted in a slightly different manner in FIGURES 10 and 11 to facilitate adjustment of the discharge orifice 80. In essence, however, the arrangement of FIGURES 10 and 11 can be identical to that shown in FIGURES 1 through 6, the difference being the central feeding of the channels 81 and 82 in FIGURES 1 through 6 rather than the end feeding thereof.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims.

The embodiments of the invention in which an exclusive privilege or property is claimed are defined as follows:

1. An extrusion die for extruding a flat laminated film; said extrusion die comprising a main die body, a first and second extending die lip, and connection means for connecting said first and second die lips to said main body; said main die body having a first flow channel extending therethrough from a first end portion to a second end portion of said die body; said first and second die lips being fixed in parallel spaced relation with respect to one another; the space between said spaced first and second die lips defining a second flow channel; said second flow channel having one end connected to said first end portion of said first flow channel; the opposite end of said second flow channel defining a discharge orifice; said first and second die lips having first and second respective axially directed passages therethrough; said first and second die lips having third and fourth flow channels respectively extending from their first and second passages, respectively, to said first flow channel.

2. The extrusion die substantially as set forth in claim 1 wherein said connection means includes adjustment means for adjustably spacing said first and second die lips from one another.

3. The die substantially as set forth in claim 1 wherein said second flow channel extends beyond either end of said third and fourth flow channels.

4. The device substantially as set forth in claim 1 wherein at least said third flow channel extends beyond either end of said second flow channel.

5. In combination; an extrusion die for extruding a flat laminated film, a first extruder, and a second extruder; said extrusion die comprising a main die body, a first and second extending die lip, and connection means for connecting said first and second die lips to said main body; said main die body having a first flow channel extending therethrough from a first end portion to a second end portion of said die body; said first and second die lips being fixed in parallel spaced relation with respect to one another; the space between said spaced first and second die lips defining a second flow channel; said second flow channel having one end connected to said first end portion of said first flow channel; the opposite end of said second flow channel defining a discharge orifice; said first and second die lips having first and second respective axially directed passages therethrough; said first and second die lips having third and fourth flow channels respectively extending from their first and second passages, respectively, to said first flow channel; said first extruder being connected to said second surface portion of said first flow channel; said second extruder being connected to said third and fourth flow channels.

6. The combination substantially as set forth in claim 5 which further includes a tenter frame assembly; one of said second flow channels and said pair of third and fourth flow channels extending beyond one another whereby to produce a laminate film whose side edges are of a like material; said tenter frame assembly including clip means for gripping the side edges of laminated film.

7. The combination substantially as set forth in claim 6 which further includes edge slitter means adapted to slit said side edges of said laminated film after said film is laterally stretched by said tenter frame assembly.

References Cited

UNITED STATES PATENTS

| | | | |
|---|---|---|---|
| 2,387,718 | 10/1945 | Coleman | 18—12 X |
| 2,592,658 | 4/1952 | Colombo | 18—14 |
| 2,761,418 | 9/1956 | Russell. | |
| 2,923,971 | 2/1960 | Nelson | 18—12 |
| 3,023,461 | 3/1962 | Sherman | 18—14 X |
| 3,151,356 | 10/1964 | Senecal | 18—12 |
| 3,241,503 | 3/1966 | Schafer | 18—13 X |
| 3,302,239 | 2/1967 | Senecal | 18—13 X |
| 3,308,222 | 3/1967 | Kovacs | 18—12 X |

WILLIAM J. STEPHENSON, *Primary Examiner.*